United States Patent [19]
McArthur

[11] 3,736,041
[45] May 29, 1973

[54] MICROSCOPE WITH SELECTIVELY OPERABLE ILLUMINATING AND VIEWING MEANS

[76] Inventor: John Norrie McArthur, Skatchbow Cottage, Landbeach, England

[22] Filed: Apr. 19, 1971

[21] Appl. No.: 135,056

[52] U.S. Cl. .........................350/87, 350/39, 350/90
[51] Int. Cl. ............................................G02b 21/08
[58] Field of Search.....350/87–90, 235–238, 254, 39

[56] References Cited

UNITED STATES PATENTS

| | | | |
|---|---|---|---|
| 2,146,506 | 2/1939 | Maisch | 350/87 |
| 3,011,399 | 12/1961 | Pfleger | 350/238 |
| 2,239,032 | 4/1941 | Boch | 350/235 |
| 1,818,974 | 8/1931 | Engelmann | 350/254 X |
| 373,634 | 11/1887 | Bausch | 350/87 X |
| 2,214,367 | 9/1940 | Gallasch | 350/87 X |
| 2,287,764 | 6/1942 | Gary | 350/87 |
| 2,433,674 | 12/1947 | O'Brien | 350/87 X |

FOREIGN PATENTS OR APPLICATIONS

| | | | |
|---|---|---|---|
| 414,324 | 8/1934 | Great Britain | 350/87 |

Primary Examiner—David H. Rubin
Attorney—William Anthony Drucker

[57] ABSTRACT

A microscope comprises a body including an opening and containing a condenser and an objective and an eyepiece constituting an optical system for viewing of a subject positioned between the condenser and the objective.

The body has an aperture on the optical axis of the condenser on the side of the condenser which is remote from the objective.

Reflector means, including two angled reflector elements, are disposed in said body and are movable linearly transversely of the optical axis of the reflector at the side of the condenser remote from the objective. A light source is positioned in the body.

The reflector means has a first position in which it intercepts the optical axis of the condenser so as to direct onto the condenser light rays from the light source, and a second position in which it directs thereonto light rays originating externally of the body, and a third position in which it does not intercept the optical axis of the condenser, thereby to permit viewing, through the aperture, of a subject magnified by the condenser.

7 Claims, 2 Drawing Figures

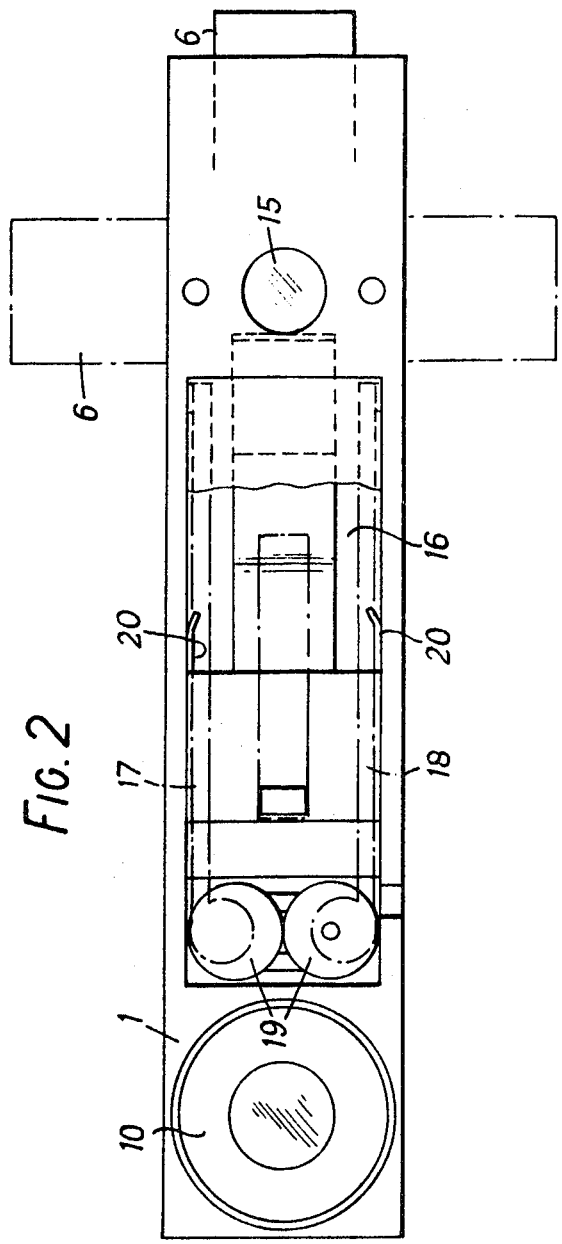

MICROSCOPE WITH SELECTIVELY OPERABLE ILLUMINATING AND VIEWING MEANS

This invention relates to a microscope, and its object is to provide an improvement whereby actuation of a movable member permits selectively the feeding of light from an internal light source, or from the exterior, to a condenser for illumination of a subject viewed through the optical system of the microscope, or direct viewing of a subject through the condenser.

According to the present invention a microscope comprises a body including an opening and containing a condenser and an objective and an eyepiece constituting an optical system for viewing of a subject positioned between the condenser and the objective, said body having an aperture on the optical axis of the condenser on the side of the condenser which is remote from the objective, reflector means including two angled reflector elements disposed within said body and movable linearly transversely of the optical axis of the reflector at the side of the condenser remote from the objective, a light source positioned in said body, said reflector means having a first position in which a first of said elements of the reflector means intercepts the optical axis of the condenser so as to direct onto the condenser light rays arriving on said element from said light source, said reflector means having a second position in which the second of said elements of the reflector means intercepts the optical axis of the condenser so as to direct onto the condenser light rays originating externally of the body and passing into the body through said opening therein, said reflector means having a third position in which neither of said elements intercepts the optical axis of the condenser, thereby to permit viewing through said aperture of a subject magnified by the condenser.

Thus, by simple actuation of a movable member, the user has the choice of (i) illumination of the condenser with internal light, (ii) illumination of the condenser with external light, or (iii) direct viewing of the condenser.

The source of light may be movable with the reflector means, and may comprise an electric light bulb. Switch means are provided for completing a current-feed circuit to said light bulb and are adapted to be closed to complete the currentfeed circuit when the reflector means is in said first position and to open when said reflector means is in said second and third positions. For example the switch means may comprise co-operating switch contact elements mounted respectively on the body and on a carrier for the reflector means.

The body advantageously includes means, for supporting a microscope slide at a location between the condenser and the objective, comprising a first surface or pair of surfaces to carry a microscope slide disposed normal to the optical axis of the objective in a first position of rotation about said axis. A second surface means is provided to carry the microscope slide when said slide is disposed normal to the optical axis of the objective in a second position of rotation about said axis. The respective planes of the first and second pairs of surfaces are spaced, along the optical axis of the objective by approximately the thickness of the microscope slide and are spaced from the objective such that a subject on said microscope slide will be in focus when said slide is inverted on said first pair of surfaces, and when obverted on said second surface means.

In a preferred embodiment, a plurality of objectives are movable transversely to permit a selected objective to be aligned with the optical axis of the condenser, and the objective is also advantageously adjustable along its own optical axis.

A microscope embodying the invention is hereinafter particularly described with reference to the accompanying drawing wherein :

FIG. 2 is a plan view, with portions shown broken away to reveal internal details.

Figure 1:
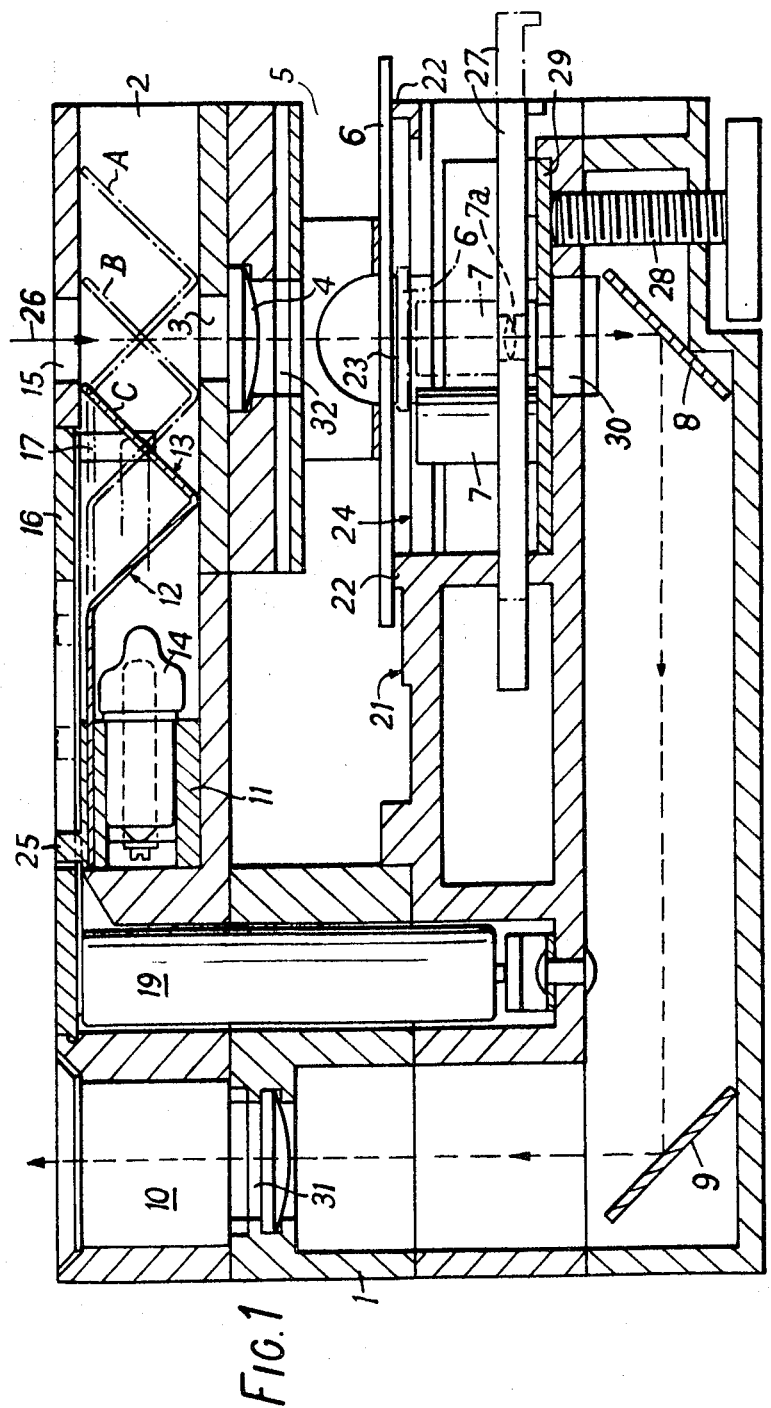
FIG. 1 is a central section of the microscope.

The microscope comprises a body 1 having at its upper part, adjacent one end, a rectangular-section channel 2 open at one end of the body. The channel 2 has an opening 3 in its base, below which is arranged a condenser lens 4. Below the condenser lens 4 there is a cut-away area 5 for the insertion and manipulation of glass microscope slides 6. Beneath that area there is mounted an objective lens 7 and below that again a reflecting surface 8 for turning the optical axis through 90° along the lower part of the body towards the other end, where another reflecting surface 9 turns the optical axis through 90° towards an eyepiece 10 positioned for viewing from above.

In the channel 2 there is positioned a carrier member 11 with a pair of reflecting surfaces 12, 13 arranged at 90° to each other and each at 45° to the longitudinal axis of the channel 2. The carrier 11 also supports a lens-fronted miniature electric bulb 14 and the reflecting surface 12 is symmetrically positioned to direct the light from the bulb downwardly into the condenser lens 4, when the carrier 11 is in position "A". The other reflecting surface 13 is positioned so that, when the carrier 11 is in position "B" it will direct into the condenser lens 4 any light coming along the axis of the channel from the exterior. The carrier 11 has a position "C" in which the reflecting surfaces are moved entirely out of alignment with the condenser lens 4, and the condenser lens can then be directly viewed, through an aperture 15 in the top of the channel, from above.

The removable top 16 for the channel 2 carries contact strips 17, 18 connected to two batteries 19 . The carrier 11 has brush contact members 20 which abut on the strips 17, 18 and complete the current path to the bulb.

The current-feed circuit to the bulb is automatically completed when the carrier is moved into position "A".

On the surface 21 there are provided two parallel tenons 22 adapted to support a slide 6 at a height, above the objective lens 7, at which (with the slide inverted) the subject 23 on the slide 6 is at the correct distance away from the objective lens 7 along its optical axis. On the surface 21 there is a recessed surface area 24 and when slide 6 is placed there, rotated through 90° about the optical axis, (and with the slide 6 in obverted position) the subject 23 on the upper surface of the slide is then again at approximately the correct position along the optical axis in relation to the objective lens 7. The difference in height of the two supports 22 and 24 is substantially the same as the thickness of a conventional glass slide 6.

The microscope is of very compact dimensions, and is substantially parallelepipedal, without projections, enabling it to be carried conveniently in the pocket or hand-bag. Movement of the carrier 11 by its knob 25 permits selection of external lighting, internal lighting, or direct viewing of the subject (magnified) through the condenser in the direction of the arrow 26. The slide can be placed in position on the respective support 22 or 24, according to whether it is inverted or obverted, and the subject 23 will automatically be presented substantially in focus.

A plurality of objective lenses 7, 7a etc. are mounted on a slider 27, so that by movement longitudinally of the slider 27 any selected one of the objective lenses can be brought into alignment with the optical axis of the condenser.

Adjustment of the objective lens 7 along its own axis is obtained by a screw 28 which presses against an apertured plate 29 to permit lifting and lowering of the slider 27 with resilient bending.

Microfilm can be inserted in a slot 30 for direct viewing through the objective lens 7, or in a slot 31 for direct viewing through the eyepiece 10, or in a slot 32 for direct viewing through the condenser 4.

I claim:

1. A microscope comprising a body including an opening and containing a condenser and an objective and an eyepiece constituting an optical system for viewing of a subject positioned between the condenser and the objective, said body having an aperture on the optical axis of the condenser on the side of the condenser which is remote from the objective, reflector means including two angled reflector elements disposed within said body and movable linearly transversely of the optical axis of the reflector at the side of the condenser remote from the objective, a light source positioned in said body, said reflector means having a first position in which a first of said elements of the reflector means intercepts the optical axis of the condenser so as to direct onto the condenser light rays arriving on said element from said light source, said reflector means having a second position in which the second of said elements of the reflector means intercepts the optical axis of the condenser so as to direct onto the condenser light rays originating externally of the body and passing into the body through said opening therein, said reflector means having a third position in which neither of said elements intercepts the optical axis of the condenser, thereby to permit viewing through said aperture of a subject magnified by the condenser.

2. A microscope, as claimed in claim 1, wherein said source of light is coupled to said reflector means for movement therewith.

3. A microscope, as claimed in claim 2, wherein said source of light comprises an electric light bulb, and wherein switch means are provided for completing a current-feed circuit to said light bulb, said switch means being arranged to be closed to complete the current-feed circuit when said reflector means is in said first position, and to open when said reflector means is in said second and third positions.

4. A microscope, as claimed in claim 3, wherein said switch means comprises co-operating switch contact elements mounted respectively on the body and on a carrier for said reflector means.

5. A microscope, as claimed in claim 1, wherein said body comprises means for supporting a microscope slide at a location between the condenser and the objective, said supporting means including a first surface means to carry a microscope slide disposed normal to the optical axis of the objective in a first position of rotation of said slide about said axis, said supporting means including a second surface means to carry said slide when said slide is disposed in a second position of rotation about said axis, the respective planes of said first and second surface means being spaced along the optical axis of the objective by approximately the thickness of the microscope slide, the respective planes of the first and second surface means being spaced along the optical axis of the objective in relation to the objective such that a subject on said slide will be in focus when said slide is inverted on said first surface means and when obverted on said second surface means.

6. A microscope, as claimed in claim 1, comprising a plurality of objectives mounted on a slide movable transversely in said body to permit a selected objective to be aligned with the optical axis of the condenser.

7. A microscope, as claimed in claim 1, comprising means in said body for adjusting the position of said objective along its optical axis.

* * * * *